3,037,934
CORROSION INHIBITION
John F. Eberhard, and Billy D. Oakes, Tulsa, Okla., assignors to The Dow Chemical Company, Midland, Mich., a corporation of Delaware
No Drawing. Filed Jan. 2, 1958, Ser. No. 706,550
4 Claims. (Cl. 252—136)

The present invention relates to corrosion inhibition and more particularly concerns the inhibition of acid systems to prevent ferrous metal corrosion.

It has been discovered that propargyl mercaptan either as a distilled reaction product or in the purified state when admixed with a corrosive acid such as an oxidizing acid, such as nitric acid, or a non-oxidizing acid, such as sulfuric acid, will inhibit ferrous metal corrosion by the acid. Good results are obtained when the propargyl mercaptan or the distilled reaction product is employed in an amount of from about 0.01 percent to about 1.0 percent by volume of the acid or acid solution. The propargyl mercaptan or propargyl mercaptan-containing reaction product may be prepared in the manner of U.S. Patent 2,707,714 or as hereinafter described.

In carrying out the present invention, the propargyl mercaptan or its impure reaction product is dispersed in an aqueous acid such as nitric acid. In a preferred manner the product is admixed with water to form an aqueous dispersion to which an acid may be added.

PREPARATION OF INHIBITOR

Hydrogen sulfide was bubbled through 112 grams (2.0 moles) of potassium hydroxide dissolved in 150 milliliters of water until a saturated solution was obtained as evidenced by the free bubbling of the hydrogen sulfide. The resulting solution was added slowly to 238 grams (2.0 moles) of propargyl bromide with stirring and cooling in an ice-bath to keep the temperature below 15° C. Upon completion of the addition the reaction mixture was permitted to stand without cooling and at room temperature for 16 hours. During this period a solid (potassium bromide) settled out and was separated by filtration. The filtrate separated into an organic layer and an aqueous layer which were separated in a separatory funnel and the organic layer fractionally distilled under reduced pressure. A propargyl sulfide product was collected in an ice-water bath at 5° C. and a propargyl mercaptan product was collected in an acetone-dry-ice bath at −78° C. This latter product may be employed in accordance with the present invention or further purified by distillation under reduced pressure to obtain a fraction boiling at 39° C. at 170 millimeters pressure and having a refractive index of 1.499 at 27° C.

EXAMPLE 1

Four gallons of propargyl mercaptan product obtained in the above manner of preparation was dispersed in 900 gallons of water and the resulting mixture admixed with 100 gallons of 70 percent nitric acid (concentrated) by adding the nitric acid to the aqueous dispersion of the inhibitor. As a result of the foregoing operations, there was obtained an inhibited nitric acid solution containing 0.4 percent by volume of inhibitor.

EXAMPLE 2

Aqueous nitric acid containing a concentration of 0.4 percent or 0.2 percent, respectively, of the reaction product of the preparation was used in the following tests to determine the degree of corrosion inhibition.

Volume of sample _____ 150 milliliters.
Metal coupon _____ AISI 1020 carbon steel (2¾" x 1" x 0.12").
Concentration of acid _____ 10 percent.

| Concentration of Inhibitor (percent by volume) | Length of test (Hrs.) | Temp., ° F. | Corrosion rate (lbs./ft.²/day) |
|---|---|---|---|
| 0 | 6 | 80 | 0.54 |
| 0.4 | 6 | 80 | 0.0011 |
| 0.2 | 16 | 80 | 0.00086 |
| 0.4 | 16 | 80 | 0.00051 |

EXAMPLE 3

In a manner similar to Example 2, corrosion tests were made employing various concentrations of inhibitor at various temperatures. The results of such tests are recorded below:

Table II
INHIBITIVE EFFECT OF THE DISTILLED REACTION PRODUCT IN 10 PERCENT NITRIC ACID SOLUTION Volume of acid _____ 150 ml.
Metal coupon _____ AISI 1020 carbon steel (2.75" x 1.0" x 0.12").

| Concentration Distilled Reaction Product, percent | Length of Test (Hrs.) | Temperature (° F.) | Corrosion Rate (lbs./ft.²/day) |
|---|---|---|---|
| 0.05 | 6 | 80 | 0.54 |
| 0.1 | 6 | 80 | 0.0038 |
| 0.2 | 6 | 80 | 0.0012 |
| 0.4 | 6 | 80 | 0.0011 |
| 0.5 | 6 | 80 | 0.0005 |
| 0.5 | 16 | 80 | 0.0005 |
| 0.5 | 32 | 80 | 0.0006 |
| 0.3 | 16 | 120 | 0.0061 |
| 0.5 | 16 | 120 | 0.0047 |
| 0.2 | 6 | 150 | 0.0083 |
| 0.4 | 6 | 150 | 0.0047 |
| 0.5 | 6 | 150 | 0.0036 |
| 0.75 | 4 | 175 | 0.0156 |

EXAMPLE 4

Maintaining the concentration of inhibitor constant while varying the concentration of aqueous acid and temperature, gave the following results in tests conducted in the manner of Example 2:

Table III
EFFECT OF THE DISTILLED REACTION PRODUCT IN VARIOUS NITRIC ACID SOLUTIONS AT 80°F. AND 150°F.

Volume of acid _____ 150 ml.
Metal coupon _____ AISI 1010 carbon steel (2.75" x 1.0" x 0.12").

| Concentration Nitric Acid, Percent | Concentration Distilled Reaction Product, Percent | Length of Test (hrs.) | Corrosion Rate, lbs./ft.²/day | |
|---|---|---|---|---|
| | | | 80° F. | 150° F. |
| 15 | 0.5 | 6 | 0.0005 | 0.0003 |
| 20 | 0.5 | 6 | 0.0007 | 0.319 |
| 25 | 0.5 | 6 | 0.0016 | 0.342 |

EXAMPLE 5

The following table shows the effectiveness of the inhibitor employing various other aqueous acids.

Table V
EFFECT OF THE DISTILLED REACTION PRODUCT ON THE CORROSION RATE IN VARIOUS ACIDS Volume of acid _____ 150 ml.
Metal coupon _____ AISI 1010 carbon steel (2.75" x 1.0" x 0.12").

Conditions of tests 16 hours exposure at 150° F.

| Acid Medium | Concentration Distilled Reaction Product, Percent | Corrosion Rate (lb./ft.²/day) |
|---|---|---|
| 10 percent Hydrochloric | 0 | 0.612 |
| 10 percent Hydrochloric | 0.4 | 0.00062 |
| 5 percent Acetic | 0 | 0.140 |
| 5 percent Acetic | 0.4 | 0.00037 |
| 5 percent Sulfuric | 0 | 0.185 |
| 5 percent Sulfuric | 0.4 | 0.00022 |
| 5 percent Phosphoric | 0 | 0.086 |
| 5 percent Phosphoric | 0.4 | 0.00033 |
| 10 percent Perchloric | 0 | 0.15 |
| 10 percent Perchloric | 0.4 | 0.0016 |

It is thus evident that the inclusion of the reaction product of the present invention or its purified form in from 0.01 to about 1.0 percent by volume in aqueous corrosive acid solutions inhibits the corrosion of metals by these acids. Thus, acids such as chromic, perchloric, nitric, hydrochloric, sulfuric, acetic, and the like, will be inhibited from corroding ferrous metals by employing the reaction product of the present invention or its purified form in accordance with the present invention.

It is to be understood that in the preparation of the inhibitor the employment of potassium hydroxide is representative only of the type of reactant. Thus, the alkali metal hydroxides such as sodium, lithium and the like, or ammonium hydroxide may be employed.

We claim:
1. A corrosion-inhibited acid consisting essentially of an aqueous solution of an acid of a kind and in a concentration sufficient to corrode ferrous metal and from about 0.01 to about 1.0 percent by volume of propargyl mercaptan.
2. A corrosion-inhibited acid as set forth in claim 1 wherein said acid is hydrochloric acid.
3. A corrosion-inhibited acid as set forth in claim 1 wherein said acid is sulfuric acid.
4. A corrosion-inhibited acid as set forth in claim 1 wherein said acid is phosphoric acid.

References Cited in the file of this patent
UNITED STATES PATENTS

| | | |
|---|---|---|
| 1,151,416 | Stevenot | Aug. 24, 1915 |
| 1,321,182 | Allen | Nov. 11, 1919 |
| 2,407,149 | Gardenier | Sept. 3, 1946 |
| 2,472,684 | Rossi | June 7, 1949 |
| 2,474,603 | Viles et al. | June 28, 1949 |
| 2,707,714 | Conklin | May 3, 1955 |
| 2,775,624 | Skeeters | Dec. 25, 1956 |
| 2,805,257 | Lowes et al. | Sept. 3, 1957 |
| 2,806,067 | Monroe et al. | Sept. 10, 1957 |
| 2,814,593 | Beiswanger et al. | Nov. 26, 1957 |
| 2,838,458 | Bachtel | June 10, 1958 |
| 2,846,294 | Patterson et al. | Aug. 5, 1958 |
| 2,880,180 | Foster et al. | Mar. 31, 1959 |

FOREIGN PATENTS

| | | |
|---|---|---|
| 357,387 | Great Britain | Sept. 24, 1931 |

OTHER REFERENCES

Corrosion Handbook, by Uhlig, pages 910–912, pub. by John Wiley and Sons, N.Y. (1948).